(No Model.)

G. N. CLEMSON.
SAW.

No. 336,697. Patented Feb. 23, 1886.

WITNESSES:
C. Neveux
C. Sedgwick

INVENTOR:
G. N. Clemson
BY Munn & Co
ATTORNEYS.

UNITED STATES PATENT OFFICE.

GEORGE N. CLEMSON, OF MIDDLETOWN, NEW YORK.

SAW.

SPECIFICATION forming part of Letters Patent No. 336,697, dated February 23, 1886.

Application filed October 27, 1885. Serial No. 181,060. (No model.)

*To all whom it may concern:*

Be it known that I, GEORGE N. CLEMSON, of Middletown, in the county of Orange and State of New York, have invented certain new and useful Improvements in Saws, of which the following is a full, clear, and exact description.

Reference is to be had to the accompanying drawings, forming part of this specification, in which similar letters of reference indicate corresponding parts in both the figures.

Figure 1:
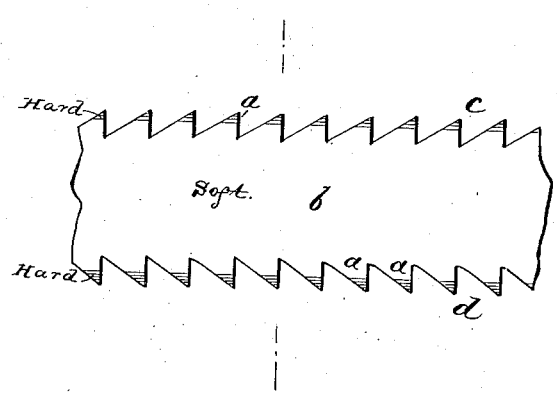
Figure 2:

Figure 1 is a side elevation of my improved saw. Fig. 2 is a transverse section.

The object of my invention is to provide a strong and efficient saw for metal working having teeth with hardened points on opposite edges thereof and having a soft center or body.

My improved saw is made of a strip of steel upon opposite edges of which are cut suitable teeth, $a$, for sawing metal. The saw-blade thus formed I heat to a suitable temperature for hardening, and then simultaneously harden the points of the teeth upon both edges of the saw, leaving the body $b$ of the saw soft.

By hardening the points of the teeth $a$ in the manner described and leaving the bases of the teeth soft I am enabled to produce a saw in which the teeth are not liable to be broken out or stripped from the edge of the saw-blade, and by leaving the body of the saw soft the saw is rendered very flexible and strong.

By hardening the teeth upon both edges of the saw the distortion of the steel due to hardening and tempering is avoided. I make the cutting-edges $c\ d$ of the saw parallel to each other, to save material in manufacture and to enable the saw to cut on a curved line.

The two sets of teeth also facilitate cutting metals on a curved line, as both sets will cut simultaneously.

I am aware that it is not new to harden the entire tooth of a saw. I am also aware that it is common to form teeth upon both edges of a saw. Therefore I do not claim these features.

Having thus described my invention, what I claim new, and desire to secure by Letters Patent, is—

As an improved article of manufacture, a saw having a soft untempered body with teeth soft and untempered at their bases and hardened at their extreme points, as herein specified.

GEORGE N. CLEMSON.

Witnesses:
 GEO. M. HOPKINS,
 C. SEDGWICK.